Sheet 1 – 2 Sheets.

A. Jackson,
Wood Fence,

N° 52,051.    Patented Jan. 16, 1866.

Witnesses.

Inventor:
A. Jackson

Sheet 2 — 2 Sheets.

A. Jackson,
Wood Fence,

Nº 52,051. Patented Jan. 16, 1866.

Witnesses:

Inventor:
A. Jackson

UNITED STATES PATENT OFFICE.

ALBERT JACKSON, OF CLIFTON SPRINGS, NEW YORK.

IMPROVEMENT IN FENCES.

Specification forming part of Letters Patent No. 52,051, dated January 16, 1866.

*To all whom it may concern:*

Be it known that I, ALBERT JACKSON, of Clifton Springs, in the county of Ontario and State of New York, have invented a new and Improved Portable Fence; and I do hereby declare that the following is a full, clear, and exact description thereof, which will enable others skilled in the art to make and use the same, reference being had to the accompanying drawings, forming part of this specification, in which—

Figure 1:
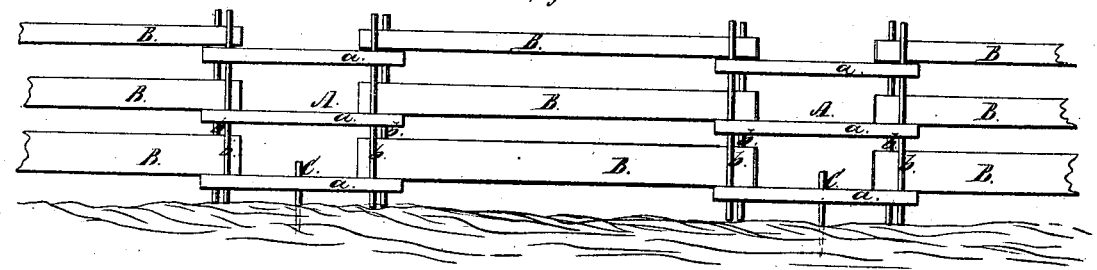
Figure 2:
Figure 3:
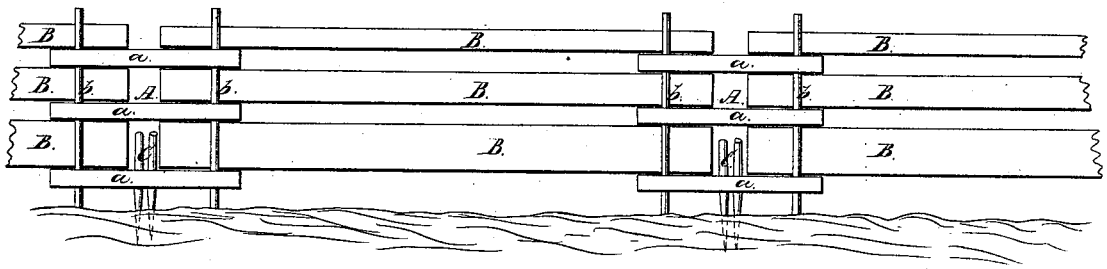
Figure 4:
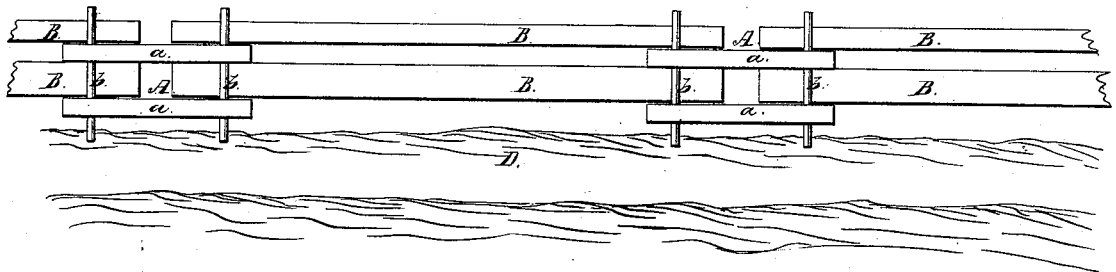
Figure 5:
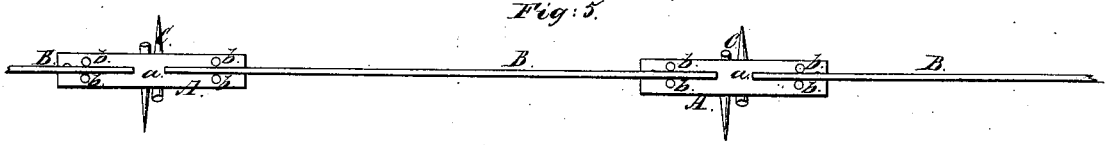
Figure 6:
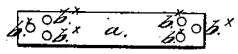

Figure 1, Sheet No. 1, is a side view of my invention; Fig. 2, a plan or top view of the same; Figs. 3 and 4, Sheet No. 2, a side view of a modification of the same; Fig. 5, a plan or top view of Fig. 3; Fig. 6, a detached plan or top view of one of the bars of a pawl pertaining to the same.

Similar letters of reference indicate like parts.

This invention relates to a new and improved portable fence, or such as may be readily put up and taken down, and when put up be firmly secured in position, and any panel of the fence readily removed or made to serve as bars in order to admit of a team passing through.

This invention is composed of what may be termed "panels A and bars or slats B." The panels are composed of three or more horizontal bars, *a*, through which vertical rods or sticks *b* are driven, two near each end. These rods or sticks, which may be of metal or wood, serve to hold the bars or slats B, the ends of which rest on the bars *a* and pass between the rods or sticks *b*, the whole forming a worm or zigzag fence, as shown clearly in Fig. 2, the bars or slats B being firmly clamped by adjusting the panels A so that the rods or sticks *b* will clamp or bind upon the ends of the boards or slats, as shown clearly in Fig. 2, holding the same in position.

The panels A may be secured in position by driving stakes C through the lower bar *a* of the panels into the ground, as shown clearly in Fig. 1.

From the above description it will be seen that by simply adjusting the panels A (any one of them) so that the bars or slats B will be loose between the rods or sticks *b* the bars or slats thus loosened may be readily removed and made to serve as bars or a gate.

The rods or sticks *b*, if made of wood, I design to have of square form and driven through round holes in the bars *a*. This will admit of moisture passing through the holes in *a* and allow a circulation of air through the holes, so as to prevent the rotting or decaying of the wood, which would be the case were the rods or sticks made to fit snugly or tightly in the bars *a*.

The invention is not confined to what is generally termed a "worm fence," for it may be erected or put up in straight form in cases where desirable. To accomplish this I have three holes, $b^*$, made in each end of the bars *a* of the panels A, two of them being in line with each other transversely with the bars. (See Fig. 6.) In putting up the straight fence I drive the rods or sticks *b* through the holes $b^*$, which are in a line transversely with the bars *a*, and place the pawls in a straight line, fitting the ends of the slats B between the rods or sticks, as shown clearly in Fig. 5. In putting up the worm fence one rod or stick is driven through one of the inner holes, $b^*$, and the other through the outer one, causing said rods or sticks to have an oblique position relatively with the panels A and to bind against the ends of the slats B, as shown in Fig. 2.

This invention also admits of the fence being erected on a mound or ledge of earth, D, as shown in Fig. 4. In this case two slats, B, would be sufficient to insert between the pawls.

This forms a very simple, cheap, and durable fence. The panels A, by having the rods or sticks pass through them, are very strong, and admit of the bars or slats B being well clamped, I do not claim, broadly, the clamping of the ends of the bars or slats between vertical slats or panels, for that has been previously done, but the parts arranged in an entirely different manner from my invention; but I do claim and desire to secure by Letters Patent—

The panels A, constructed of horizontal parallel bars *a*, with rods or sticks *b* passing vertically through or otherwise attached to them, in combination with the bars or slats B, all being arranged, as shown, to admit of the ends of the bars or slats being fitted between the rods or sticks *b*, substantially as set forth.

The above specification of my invention signed by me this 28 day of September, 1865.

ALBERT JACKSON.

Witnesses:
M. M. LIVINGSTON,
C. L. TOPLIFF.